US007439464B2

(12) United States Patent
Yamamoto et al.

(10) Patent No.: US 7,439,464 B2
(45) Date of Patent: Oct. 21, 2008

(54) WATERPROOF SWITCH

(75) Inventors: Takao Yamamoto, Saitama (JP); Yukiyoshi Takatsu, Saitama (JP); Noriaki Ohta, Saitama (JP)

(73) Assignees: Honda Motor Co., Ltd., Tokyo (JP); Toyo Denso Co., Ltd., Tokyo (JP)

( * ) Notice: Subject to any disclaimer, the term of this patent is extended or adjusted under 35 U.S.C. 154(b) by 100 days.

(21) Appl. No.: 11/653,447

(22) Filed: Jan. 16, 2007

(65) Prior Publication Data
US 2007/0163868 A1    Jul. 19, 2007

(30) Foreign Application Priority Data
Jan. 17, 2006    (JP) .................... P2006-008569

(51) Int. Cl.
*H01H 13/06* (2006.01)

(52) U.S. Cl. ................... 200/302.1; 200/302.2

(58) Field of Classification Search ... 200/302.1–302.3, 200/329, 61.62, 332.1, 332.2, 341, 295
See application file for complete search history.

(56) References Cited

U.S. PATENT DOCUMENTS 4,124,790 A * 11/1978 Kumbera et al. ............ 218/138
5,634,791 A *  6/1997 Matsuura et al. ............. 433/87
7,288,734 B2 * 10/2007 Shiroshita ................ 200/61.44

FOREIGN PATENT DOCUMENTS

JP         59-70884 U       5/1984
JP       2007193973 A  *   8/2007

* cited by examiner

*Primary Examiner*—Michael A. Friedhofer
*Assistant Examiner*—Lisa N Klaus
(74) *Attorney, Agent, or Firm*—Westerman, Hattori, Daniels & Adrian, LLP.

(57) ABSTRACT

Enhancing efficiency in assembling a waterproof switch, and enhance flexibility of seal design. The waterproof switch 7 includes a plunger 11 accommodated in a cylindrical case 10 capable of moving in the longitudinal direction, and to which a spring 17 applies a force in a direction. One end of the plunger 11 is provided with a common contact point 16 which contacts with contact point terminals 18 and 19 when predetermined amount of displacement to the spring 17 which applies the force to the plunder 11 is provided. A concave portion 10a is that to which a seal 13 for a sliding part of the plunger 11 is attached, and this concave portion 10a is provided to an end portion of the case 10. Assembling is proceeded while recognizing how the seal 13 is attached thereto from the appearance in the assembling process.

4 Claims, 3 Drawing Sheets

WATERPROOF SWITCH

BACKGROUND OF THE INVENTION

1. Field of the Invention

The present invention relates to a waterproof switch, and particularly to a waterproof switch suitable for enhancing its waterproof functions and for improving workability with which to attach a sealing member for waterproofness to the waterproof switch.

2. Description of the Related Art

A rear stop switch has been known as a switch which detects brake operations in response to a movement of a foot brake of a motorcycle or the like, and which thus lights a stop lamp. In a case of a rear stop switch of a conventional type, for example, a plunger is accommodated in a cylindrical case in a state where an end of the plunger penetrates through a sealing member and juts out of the case, and a spring member applies a force to the plunger toward the interior of the case. Lead contact points are configured to be capable of engaging with a contact point provided to the other end of the plunger, that is, a contact point provided to a portion in the interior of the case. This configuration makes the lead contact points engage (come into contact) with the contact point, and thus causes a detection signal indicating a stop operation to be outputted, if the stop operation draws the plunger out of the case against the spring. A switch of this type is disclosed, for example, in the specification of Utility Model Application Sho. 57-166347 (Unexamined Utility Model Application Publication Sho. 59-70884).

In a case of a rear stop switch of a conventional type described in Patent Document 1, when assembling the rear stop switch, first of all, a seal and a spring member (a coil spring) are attached to the bottom portion of a cylindrical case. Subsequently, a plunger is caused to penetrate through the coil spring and the seal. During this work, it is likely that the seal may be out of place because the plunger and the coil spring interferes with the seal. For this reason, in the conventional practice, it takes a long time to carry out the assembling work.

In addition, it is difficult to visibly check on the bottom portion of the cylindrical case. For this reason, as well, it takes much labor to make the visible check in some cases. With this taken in consideration, there has been a demand that the seal be attached to the rear stop switch efficiently by improving the time- and labor-consuming work.

On the other hand, the seal is used for making the rear stop switch not only waterproof but also dust-resistant. For this reason, that has been a demand that latitude of design be enlarged by using a larger seal for the purpose of enhancing the waterproofness and dust-resistance of the rear stop switch. If, however, the outer diameter of the seal is made larger than the outer diameter of the coil in the coil spring, this enlargement affects the expansion and contraction of the coil spring. This makes it impossible to enlarge the size of the seal.

SUMMARY OF THE INVENTION

An object of the present invention is to provide a waterproof switch which realizes an improved workability with which to attach a seal to the switch and an enhanced waterproofness, and which can be provided with an independent dust-resistance function.

The present invention made for the purpose of fulfilling the foregoing object is carried out as a waterproof switch which includes a plunger, a spring, and electric contact point terminals. The plunger is provided to the interior of a cylindrical case by being movably supported in a cylindrical case, and by protruding an end of the plunger out of the case, in order that the plunger can receives an external force. The spring is accommodated in the case for the purpose of applying a force to the plunger. The electrical contact point terminals are provided respectively to the plunger and the case. The waterproof switch is configured to close the electrical contact point terminals when the external force causes the plunger to provide a predetermined amount of displacement against the spring. The waterproof switch has a first characteristic that the waterproof switch includes a concave portion and a seal. The concave portion is open to the end portion of the case, and forms a space in the circumference of the plunger. The seal is provided to the concave portion for the purpose of sealing the interstice between the case and the circumference of the plunger.

The present invention has a second characteristic that the seal is a rubber seal configured of an anti-fluid sealing part and an anti-dust sealing part.

In addition, the present invention has a third characteristic that the anti-fluid sealing part is arranged inward of the anti-dust sealing part.

Moreover, the present invention has a fourth characteristic that the waterproof switch is that used for a rear stop switch for a vehicle.

In the case of the present invention having the first characteristic, the spring for applying a force to the plunger is accommodated in the case, and the concave portion which is open to the outside of the case, and in which to accommodate the seal, is formed as an entity separated from a space in which to accommodate this spring. This configuration makes it possible to assemble the waterproof switch while visibly checking with the appearance on whether or not the seal is arranged in the case properly. This makes it possible to enhance efficiency for assembling work. In addition, this brings about an effect that latitude of designing the seal can be increased. That is because the formation of the concave portion in the end portion of the case makes dimensional tolerance larger.

The second and the third characteristics makes it possible for the waterproof switch to exhibit better performance of sealing itself off water, dirt, dust and the like.

The fourth characteristic makes it possible to bring a remarkable waterproof and anti-dust effect to vehicles used while exposed to the severe external environment, particularly to vehicles of saddle-riding type including motor cycles.

DETAILED DESCRIPTION OF THE PREFERRED EMBODIMENTS

Figure 3:
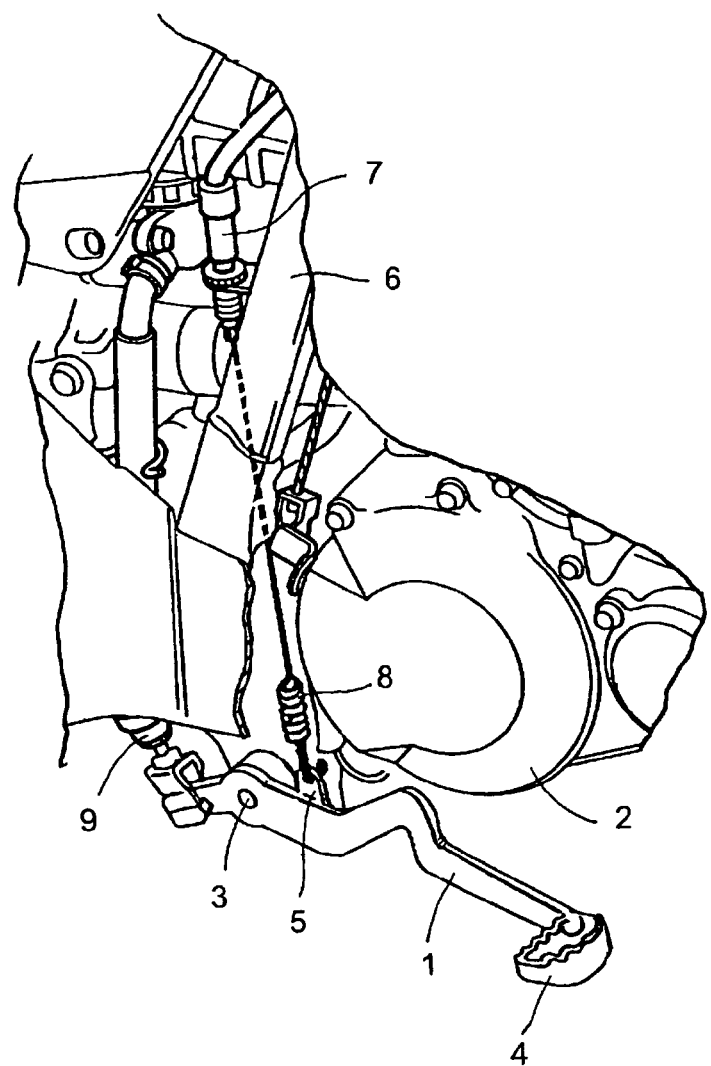
FIG. 3 is a perspective view of a main part of a vehicle to which the waterproof switch according to the embodiment of the present invention is applied.

Descriptions will be provided below for an embodiment of the present invention by referring to the drawings. FIG. 3 is a perspective view of a main part of a vehicle which includes a rear stop switch, and for which waterproof and anti-dust performance is highly required. A brake arm 1 is arranged adjacent to, and at the right side of, a crank case 2. The brake arm 1 is swingably supported by a pivot 3 attached to a vehicle body frame. A latch 5 which protrudes upward is arranged in the brake arm 1 between the front end part 4 and the pivot 3 of the brake arm 1. A rear stop switch 7 is attached to the vehicle body frame 6. A plunger (described later) of the rear stop switch 7 is linked to the latch 5 by use of a return spring 8. A rear end of the brake arm 1 is linked to a hydraulic piston 9 for generating a hydraulic pressure to be applied to the brake in response to a step on the brake arm 1.

With this configuration, once the brake arm 1 is stepped on, a hydraulic pressure is applied to a rear brake caliper, which is not illustrated, by the hydraulic piston 9, and thereby an arresting force works on a rear wheel of the vehicle. In conjunction with the arresting force, the plunger of the rear stop switch 7 is pulled via the return spring 8. This operation closes the contact points of the rear stop switch 7, and thus lights a rear stop lamp (not illustrated) of a rear portion of the vehicle.

Figure 1:
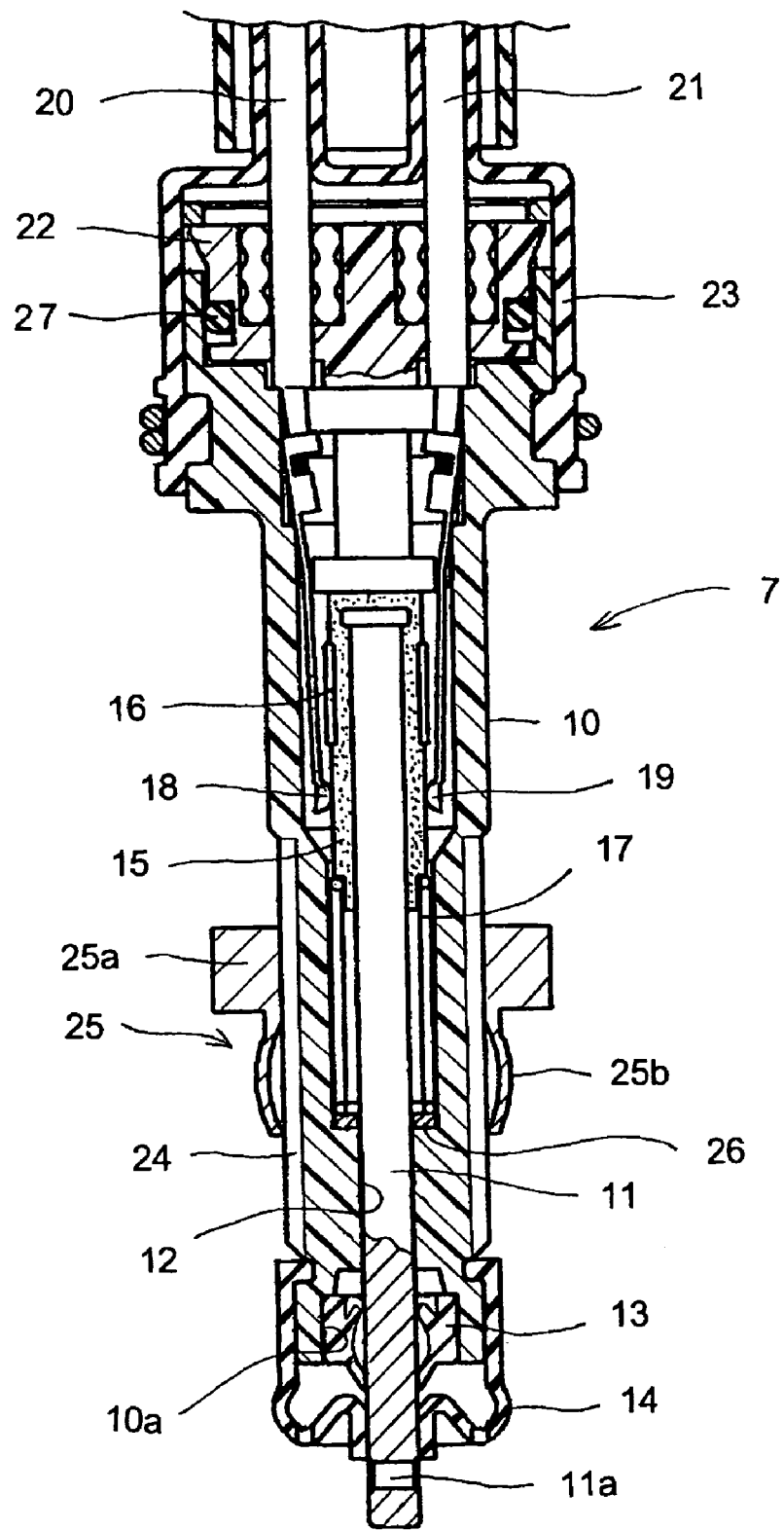
FIG. 1 is a cross-sectional view of a waterproof switch according to an embodiment of the present invention.
Figure 2:
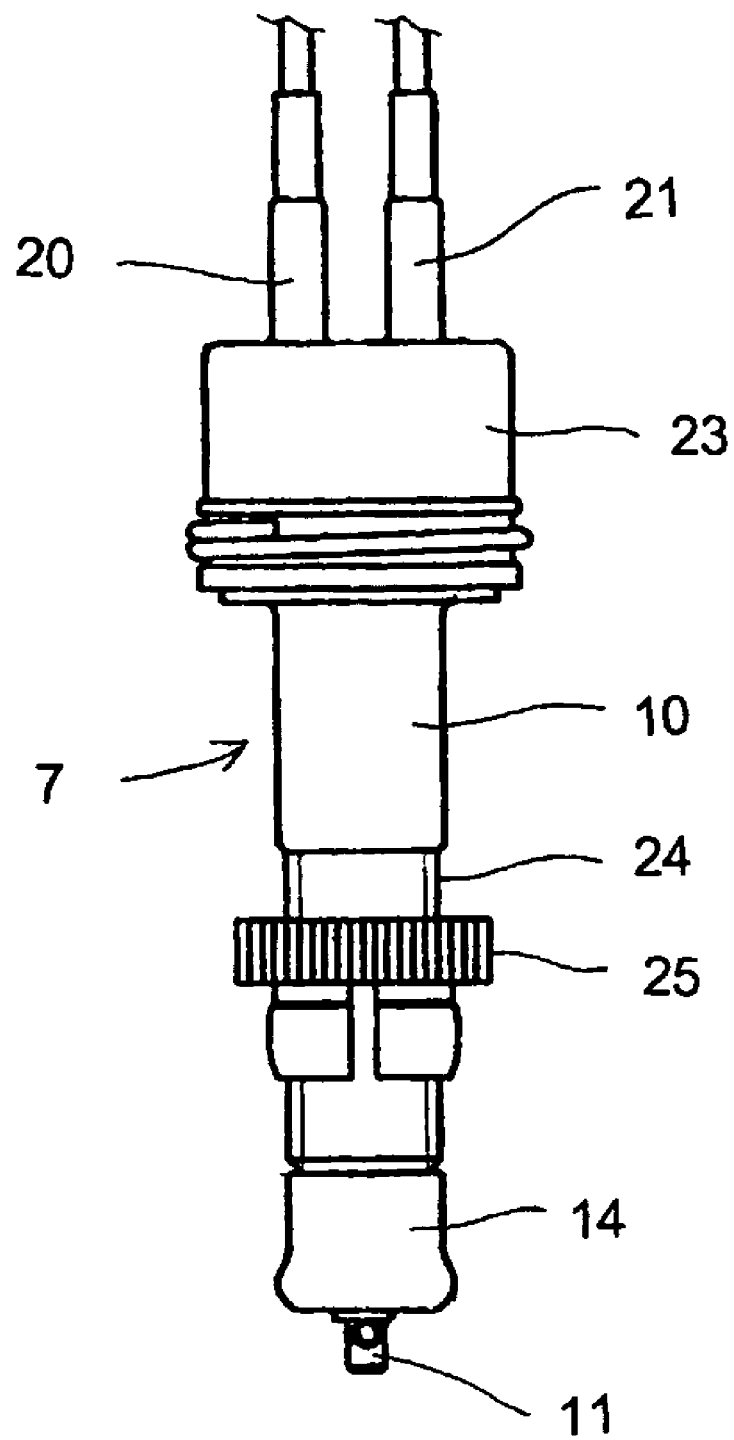
FIG. 2 is a front elevation of the waterproof switch according to the embodiment of the present invention.

FIG. 2 is a diagram showing an external appearance of the rear stop switch. FIG. 1 is a cross-sectional view of the rear stop switch taken along the A-A line of FIG. 2. The rear stop switch 7 includes a cylindrical case 10, which is a main body of the rear stop switch 7, and the plunger 11 which is fitted in the case 10. It is preferable that a material of the case 10 be polypropylene, and that a material of the plunger 11 be a stainless steel. The plunger 11 is supported by a journal 12 of the case 10 in a way that the plunger 11 is capable of sliding relative to the case 10. A concave portion 10a is formed in an extremity (shown as a lower end in FIG. 1) of the case 10. A seal 13 is inserted in this concave portion 10a. The plunger 11 passes through the journal 12, and a part of the plunger 11 protrudes out of the extremity of the case 10. A hole 11a into which to hook an end portion of the return spring 8 is formed in the protruding part of the plunger 11.

The extremity of the case 10 is covered with a lower cover 14 for protecting the seal 13. The lower cover 14 includes a through-hole which allows the extremity of the plunger 11 to penetrate through the lower cover 14, and to extend outwards. It is preferable that a material of the lower cover 14 be rubber. An insulating cylinder 15 is fixed to an upper portion of the plunger 11. In addition, a cylindrical contact point (common contact point) 16 is inserted and fitted to a part of the circumference of the insulating cylinder 15. It is preferable that a material of the insulating cylinder 15 be nylon.

A compression coil spring 17 is provided thereto in order for the plunger 11 to be pulled into the case 10, that is, in order for the plunger 11 to be pulled upward in FIG. 1. A washer 26 is interposed between the lower end surface of the compression coil spring 17 and the bottom portion of the case 10. Lead contact points 18 and 19 are provided to the circumference of the insulating cylinder 15. The lead contact points 18 and 19 are extended from above in order that the extremities of the respective lead contact points 18 and 19 can contact the circumference of the insulating cylinder 15. Positions of the respective lead contact points 18 and 19 are set in order that the lead contact points 18 and 19 can be brought into contact with the cylindrical contact point 16 when the plunger 11 provides a displacement in a direction in which the plunger 11 is pulled out of the case 10 against a repulsive force of the compression coil spring 17. The lead contact points 18 and 19 are connected respectively to lead wires 20 and 21. A connecting portion between the lead wire 20 and the contact point 18 and a connecting portion between the lead wire 21 and the contact point 19 are held in the case 10 by means of a terminal stage 22. An o-ring 27 is provided to the interstice between the terminal stage 22 and the case 10. The upper portion of the case 10 in which the terminal stage 22 is inserted is covered with an upper cover 23 made of rubber.

A circumference of the extremity of the case 10 is provided with a screw part 24. An adjustment nut 25 is screwed into the screw part 24. The adjustment nut 25 is configured of a thumb section 25a and an engagement section 25b extending downward from the thumb section 25a. The engagement section 25b is caused to engage with an attachment rib which is provided to the vehicle body frame 6 (see FIG. 3), and thus plays a function of holding the rear stop switch 7 to the vehicle body. For this reason, when the adjustment nut 25 is turned relative to the case 10, this turn makes it possible to adjust the distance between the rear stop switch 7 and the brake arm 1.

Figure 4:
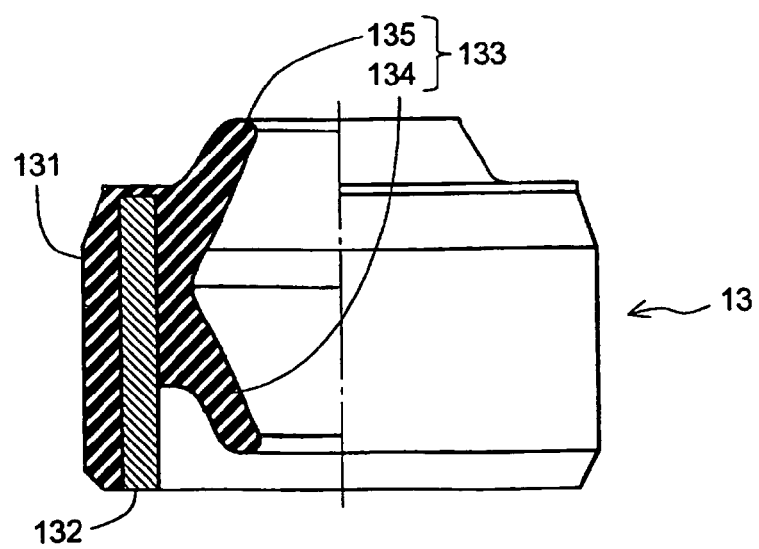
FIG. 4 is a partial cross-sectional view of a seal used for the waterproof switch according to the embodiment of the present invention.

FIG. 4 is a partial cross-sectional view of the seal 13. The seal 13 has both an anti-fluid function and an anti-dust function. The seal 13 is configured of a main body 131 and a reinforcement ring 132. An internal circumference of the main body 131 is provided with lips 133 which jut out. The lips 133 include an anti-fluid sealing part 134 and an anti-dust sealing part 135. The anti-fluid sealing part 134 is suitable for preventing oil and water from entering the inside. The anti-dust sealing part 135 is that for preventing sand, dust and the like from entering the inside. The anti-fluid sealing part 134 and the anti-dust sealing part 135 are attached to the seal 13 in a way that the anti-fluid sealing part 134 is located closer to the interior of the case 10, and in a way that the anti-dust sealing part 135 is located closer to the exterior of the case 10, that is, in a way that the anti-dust sealing part 135 is located opposite to the inner surface of the lower cover 14.

Because the seal 13 has the anti-fluid sealing part 134 and the anti-dust sealing part 135, when sand and dust containing fluids enter the interior of the lower cover 14, first of all, the anti-dust sealing part 135 prevents the fluids, the sand and the dust from entering the interior of the switch. Even if there are fluids which the anti-dust sealing part 135 cannot prevent from entering the interior of the switch, the anti-fluid sealing part 134 located closer to the interior of the switch blocks the fluids from entering beyond the ant-fluid sealing part 134. As a result, the fluids can be securely prevented from entering the deeper interior of the switch.

When the foregoing rear stop switch 7 is intended to be assembled, first of all, a washer 26 is placed in the bottom portion of the case 10. Subsequently, the compression coil spring 27 is fitted into the bottom portion thereof. Thereafter, the plunger 11 to which the insulating cylinder 15 and the cylindrical contact point 16 have been beforehand fixed is caused to penetrate through the compression coil spring 17 and the journal 12, and thus the plunger 11 is held in the case 10. After that, the lead contact points 18 and 19 along with the terminal stage 22 are inserted in the case 10 from above. The terminal stage 22 is brought into intimate contact with the inner surface of the case 10 with the O-ring 27 interposed in between, and thus the terminal stage 22 and the case 10 are fixed to each other. Subsequently, the seal 13 is fitted into the interstice between the part of the plunger 11 which protrudes out of the case 10 and the concave portion 10a of the case 10, and thereafter these fitting arrangements are covered with the lower cover 14. The adjustment nut 25 is screwed into the screw part 24 at an appropriate time before the fitting arrangements are covered with the lower cover 14.

As described above, the seal 13 is designed to be fitted in an opening at the end portion of the case 10, that is, the concave portion 10a of the case 10. This makes it possible to visibly check with ease on whether or not the seal 13 is properly fitted into the concave portion 10a while assembling the rear stop switch 7. As a result, this makes it possible to enhance efficiency for assembling work.

Furthermore, the seal 13 is designed to be capable of being accommodated in the concave portion 10*a*, which is an accommodation part independent of the compression coil spring 17. This makes it possible to optimally determine the dimensions of the seal 13 regardless of the dimensions of the compression coil spring 17. As a result, this makes it possible to provide a switch suitable for detecting operations of the rear brake in an off-road motorcycle, a rough terrain vehicle of a saddle-riding type and the like, which run while affected by sand and water.

Note that, although what is obtained by forming the anti-dust sealing part and the anti-fluid sealing part integrally into a unit has been described as the seal 13, the present invention does not limit the seal 13 to the seal of the foregoing type. The anti-fluid sealing part and the anti-dust sealing part may be arranged independently of each other in the seal 13. In sum, it suffices if the seal is configured to be capable of being attached from outside to the accommodation part provided to the end portion of the case which is the switch main body.

Furthermore, although the present invention is suitable as the stop switch for a vehicle, the present invention can be widely applied to not only the switch for a vehicle, but also a switch having a configuration in which: a plunger with contact points is included in a cylindrical main body of the switch; a spring is arranged in the cylindrical main body in a way that the spring is movable manually; the spring applies a force to the plunger in a direction; and the interstice between this plunger and the cylindrical main body is sealed with a seal.

What is claimed is:

1. A waterproof switch which includes:
   a cylindrical case;
   a plunger which is provided to the interior of the case by being movably supported in the case, and by protruding an end of the plunger out of the case, in order that the plunger can receive an external force;
   a spring, accommodated in the case, for applying a force to the plunger; and
   electrical contact point terminals provided to the plunger and the case, respectively,
   the waterproof switch which is configured to close the electrical contact point terminals when the external force causes the plunger to provide a predetermined amount of displacement against the spring,
   the waterproof switch comprising:
   a concave portion which is open to an end portion of the cylindrical case, and which forms a space in a circumference of the plunger, wherein the concave portion is provided with a seal for sealing the interstice between the case and the circumference of the plunger.

2. The waterproof switch as recited in claim 1, wherein the seal is a rubber seal configured of an anti-fluid sealing part and an anti-dust sealing part.

3. The waterproof switch as recited in claim 2, wherein the anti-fluid sealing part is arranged inward of the anti-dust sealing part.

4. The waterproof switch as recited in any one of claims 1 to 3, being a rear stop switch for a vehicle.

\* \* \* \* \*